US011273595B2

(12) United States Patent
Richardson et al.

(10) Patent No.: US 11,273,595 B2
(45) Date of Patent: Mar. 15, 2022

(54) METHOD OF AND APPARATUS FOR ADDITIVE LAYER MANUFACTURE

(71) Applicant: Reliance Precision Limited, Huddersfield (GB)

(72) Inventors: William Thomas Richardson, West Yorkshire (GB); Ian Laidler, West Yorkshire (GB); Liam Blunt, West Yorkshire (GB)

(73) Assignee: Reliance RG Limited, Huddersfield (GB)

( * ) Notice: Subject to any disclaimer, the term of this patent is extended or adjusted under 35 U.S.C. 154(b) by 207 days.

(21) Appl. No.: 16/484,231

(22) PCT Filed: Jan. 31, 2018

(86) PCT No.: PCT/GB2018/000019
§ 371 (c)(1),
(2) Date: Aug. 7, 2019

(87) PCT Pub. No.: WO2018/146441
PCT Pub. Date: Aug. 16, 2018

(65) Prior Publication Data
US 2019/0389130 A1 Dec. 26, 2019

(30) Foreign Application Priority Data

Feb. 8, 2017 (GB) ..................................... 1702129

(51) Int. Cl.
*B29C 64/188* (2017.01)
*B29C 64/214* (2017.01)
(Continued)

(52) U.S. Cl.
CPC .......... *B29C 64/188* (2017.08); *B29C 64/153* (2017.08); *B29C 64/214* (2017.08);
(Continued)

(58) Field of Classification Search
CPC .. B22F 2999/00; B22F 10/20; B22F 2202/01; B22F 3/1055; B22F 10/30;
(Continued)

(56) References Cited

U.S. PATENT DOCUMENTS 5,460,785 A 10/1995 Langer et al.
2004/0173946 A1 9/2004 Pfeifer et al.
(Continued)

OTHER PUBLICATIONS

Bin Zhang et al, "In situ topography of laser powder bed fusions using fringe protection", Additive Manufacturing, vol. 12, Aug. 16, 2016, pp. 100-107.

*Primary Examiner* — Mark A Osele
*Assistant Examiner* — Evan T Hulting
(74) *Attorney, Agent, or Firm* — Invention To Patent Sendees; Alex Hobson

(57) ABSTRACT

A method of additive layer manufacture includes the steps of successively depositing layers of fusible powder material in overlying relationship and introducing energy, such as by an electron beam, into each deposited layer to selectively melt material in the layer so as to fuse the melted material together and to already fused material of a layer thereunder in order to produce a three-dimensional solid article in successive cross-sectional layers. In order to monitor layer quality, structured light defining a fringe pattern is projected onto each deposited layer before and/or after melting of material in that layer and the fringe pattern on each layer is imaged from a perspective different from that of the projection so as to reveal disturbance of the pattern by topographical features of the layer.

16 Claims, 2 Drawing Sheets

(51) Int. Cl.
*B29C 64/153* (2017.01)
*B29C 64/245* (2017.01)
*B29C 64/393* (2017.01)
*B29C 64/268* (2017.01)
*B33Y 10/00* (2015.01)
*B33Y 30/00* (2015.01)
*B33Y 40/00* (2020.01)
*B33Y 50/02* (2015.01)

(52) U.S. Cl.
CPC .......... *B29C 64/245* (2017.08); *B29C 64/268* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC .. B22F 2003/1057; B22F 3/105; B33Y 10/00; B33Y 30/00; B33Y 40/00; B33Y 50/02; B33Y 50/00; B29C 64/153; B29C 64/188; B29C 64/194; B29C 64/205; B29C 64/214; B29C 64/245; B29C 64/268; B29C 64/386; B29C 64/393; G01B 11/167; G01B 11/306; G01N 2021/8832; G01N 21/85; G01N 21/956; Y02P 10/25; Y02P 10/295
See application file for complete search history.

(56) References Cited

U.S. PATENT DOCUMENTS

| | | |
|---|---|---|
| 2015/0024233 A1 | 1/2015 | Gunther |
| 2015/0306666 A1* | 10/2015 | Honda ................. B29C 64/255 425/78 |
| 2017/0239892 A1 | 8/2017 | Buller et al. |
| 2018/0015544 A1* | 1/2018 | Schmitt ................. B22F 10/20 |
| 2018/0186082 A1* | 7/2018 | Randhawa ........... B23K 26/125 |

* cited by examiner

METHOD OF AND APPARATUS FOR ADDITIVE LAYER MANUFACTURE

CROSS REFERENCE TO RELATED APPLICATIONS

This application is a national stage entry of PCT/GB2018/000019, filed on Jan. 31, 2018, which claims the benefit of priority to GB1702129.6, filed on Feb. 8, 2017, the entirety of both are hereby incorporated by reference herein.

BACKGROUND OF THE INVENTION

Field of the Invention

The present invention relates to a method of and apparatus for additive layer manufacture, especially a method and apparatus which may make it possible to monitor aspects of the manufacturing process and influence the process as a function of the monitoring results

Background

Additive layer manufacturing is a process in which material is selectively deposited onto a substrate in layers with the object of forming a three-dimensional article. A well-established technology employed for this process is powder bed fusion, in which a thin layer of powder—normally metal or plastic—is selectively melted by an energy source such as a laser or electron beam. The melted area of the powder layer forms a cross-sectional part of the article, whereas unmelted powder in the layer is discarded and usually recycled at the end of the process. After each layer has been selectively melted, a new layer of powder is deposited and then selectively melted so that the complete article is constructed layer-by-layer from melted and thus fused powder.

Melting and fusing by way of an electron beam has been in use for a period of time and is carried out by controlled beam deflection over the powder layer by means of electromagnetic deflectors arranged in a Cartesian deflection system. The powder layer is mapped into X/Y co-ordinates forming an addressable grid for the deflection electronics and the pattern to be created is transferred to this grid. The beam is then scanned using simple lines of varying lengths and defined by a start point and an end point.

The quality of the fused layer is dependent upon many aspects, including the quality of the deposited powder layer. Powder is spread upon a substrate and subsequently becomes a layer of fused material as the build progresses on the layer-by-layer basis. In order to achieve a build process and final product of assured quality, monitoring of apparatus parameters together with monitoring of the powder bed and the fused layer are desirable. Process monitoring can be provided by, for example, a high-resolution visual-spectrum camera providing porosity information in relation to melt areas. In addition, post-build techniques can be employed to measure the finished article.

The powder deposition process is, to date, unquantified. Challenges are presented to any in-process monitoring system when melting is carried out by, in particular, an electron beam. The melting process takes place at a high temperature and the vicinity of the build is at an elevated ambient temperature of circa 700° C. in a vacuum environment, which is established in a vacuum chamber and necessary for propagation of the electron beam. Moreover, melting and fusing of the powder result in evaporation of the powder and subsequent re-sublimation of evaporated material on any accessible surface inside the vacuum chamber. The need to protect the inside of the chamber results in the placement of baffles that limit the line-of-sight of imaging systems and when line-of-sight can be achieved the first optical element facing the powder can very quickly be contaminated with solidified powder, in particular metallised in the case of metallic powder material. The scanning rate in electron beam apparatus is fast and the rate-limiting event is typically that of the powder deposition. Any monitoring procedure that lengthens this step is unwanted in terms of throughput, but any method that helps monitor and hasten the process is desirable.

Under these conditions a monitoring system is required to check, before and/or after fusing, for anomalies within the powder layer, for example variations in powder density, variations in surface topography such as long, medium and short range changes in powder surface, undulations and powder clumping. Geometrical irregularities in surface topography caused by a powder recoater or spreader, recoating, speeds and recoating depth, for example due to natural vibrations of the recoater, are of substantial significance.

SUMMARY OF THE INVENTION

It is therefore the principal object of the present invention to provide measures, in the context of additive layer manufacture, to enable monitoring of process parameters of the kinds mentioned, particularly characteristics of the material layers involved in the manufacturing process.

A further object of the invention is creation of a monitoring procedure which can be performed on a real-time basis and allows intervention in the process to remedy identified faults and/or to prevent faults from arising as the build progresses.

Yet another object is inclusion in an additive layer manufacturing process and apparatus of a monitoring procedure and system compatible with manufacturing by use of an electron beam as an energy source, in particular suitable for the high-temperature and vacuum environment associated with electron beam generation and scanning.

Other objects and advantages of the invention will be apparent from the following description.

According to a first aspect of the present invention there is provided a method of additive layer manufacture comprising the steps of successively depositing layers of fusible powder material in overlying relationship, introducing energy into each deposited layer to selectively melt material in the layer so as to fuse the melted material together and to already fused material of a layer thereunder for production of a three-dimensional solid article in successive cross-sectional layers, projecting structured light defining a fringe pattern onto each deposited layer in at least one of a time before and a time after the melting of material in that layer, imaging the fringe pattern on each layer from a perspective different from that of the projection so as to reveal disturbance of the pattern by topographical features of the layer, analysing the imaged fringe pattern with respect to any such revealed disturbance to recognise defects in the respective layer of powder material if the structured light was projected onto that layer before the melting of material therein or defects in a cross-sectional layer of the article formed from the respective powder material layer if the structured light was projected onto that layer after the melting of material therein, and correctively influencing layer deposition in the case of recognition of defects in the powder material layer and energy introduction in the case of recognition of defects in the article cross-sectional layer.

Such a method offers the advantage that that monitoring of each powder material layer deposited for additive layer manufacture can be carried out by non-contact metrology employing a procedure effective for revealing diverse faults attributable to defective layer topography, as a result of which mitigation or elimination of the revealed faults can be carried out in the course of manufacture, thus on a real-time basis. The method makes it possible to carry out multiple projection and imaging in relation to each individual layer so that the layer can evaluated before melting in order to provide an opportunity for faults in the deposited powder layer to be addressed and/or after melting in order to provide an opportunity to address problems with the quality of the melting. Advantage can be taken of the availability of precise optical equipment, reliable image-processing software and fast computing to optimise the reliability and accuracy of the measuring or monitoring process.

The step of analysing to recognise defects in the powder material layer preferably comprises recognition of local variations in depth of the layer, which enables immediate identification of one of the principal causes of departure of a manufactured article from its specification. Such recognised local variations in the depth of the powder material layer can include depressions in the form of undulations in the layer or voids or areas of missing powder in the layer and/or elevations in the form of undulations in the layer or displacements due to protrusions into the layer from below. Recognition of variations of these kinds allows a decision to be taken on remedial action in relation to either the current powder material layer or the next powder material layer, depending the nature and magnitude of a recognised variation and its disposition in the layer, such as inside or outside the intended melt area of the layer concerned.

Similarly, the step of analysing to recognise defects in the article cross-sectional layer preferably comprises recognition of local variations in depth of the cross-sectional layer, again a principal cause of impairment of the quality of the finished article. The recognised local variations in the depth of the cross-sectional layer can include depressions caused by voids or areas of missing powder in the powder material layer from which the cross-sectional layer was formed or by generation of the cross-sectional layer otherwise than in accordance with specification and/or elevations caused by swelling of the article during production in a direction perpendicular to the cross-sectional layer or by generation of the cross-sectional layer otherwise than in accordance with specification. Recognition of variations of these kinds in an article cross-sectional layer allows a decision to be taken to with regard to corrective action on the current cross-sectional layer or the next cross-section layer, depending on the nature, magnitude and location of a recognised variation, so that development of the article can be not only monitored, but also influenced if or when necessary.

For preference, the step of analysing comprises identifying recognised local variations by assignment of Cartesian co-ordinates. Assignment of Cartesian co-ordinates, which are widely employed in the control of additive layer manufacturing apparatus, to fault locations allows simple and rapid pinpointing of places where remedial action is needed and straightforward correction of the operation of apparatus components already subject to co-ordinate-based control.

The step of analysing preferably comprises subjecting the imaged fringe pattern to a fringe pattern algorithm to obtain a wrapped phase, subjecting the wrapped phase to a phase unwrapping algorithm to obtain an unwrapped phase giving true phase and processing the true phase by a phase-to-height model to give an elevation height or depression depth. Algorithms for these purposes are known and can provide absolute height/depth dimensions clearly characterising the extent to which topographical features cause departure from ideal planarity of a layer surface. The step of analysing to recognise defects in the article cross-sectional layer may additionally or alternatively comprise recognition of departure of the shape of the melt area from a predetermined shape, thus, for example, regions omitted from melting and regions that should not have been melted, the former being capable of rectification by action in relation to the current layer and the latter requiring corrective action on the next layer and possibly finish-machining of the manufactured article.

So far as correctively influencing powder layer deposition in concerned, this may be able to be undertaken by one or more of vibrating a powder material layer to resettle the powder material thereof, repetition of smoothing of the top surface of a powder material layer, adding material to or removing material from a powder material layer and even entirely replacing a powder material layer. Selection from procedures of these kinds can be made in dependence on the type and location of the respective recognised defect and the most appropriate remedy. Similarly, and as already indicated, the step of correctively influencing layer deposition can be carried out on the current powder material layer and/or on a subsequent powder material layer depending on, inter alia, the nature of the recognised defect.

In the case of correctively influencing energy introduction, this may be undertaken by at least partial remelting of material in the article cross-sectional layer. If the energy introduction is to be correctively influenced in relation to a subsequent layer this may be carried out by, for example, adjusting such parameters as beam power, beam spot size, beam scanning rate, etc., prior to the next scanning, i.e. selective melting, step.

The step of projecting preferably comprises forming the fringe pattern to be substantially coincident with the area of the powder bed layer in which selective melting is carried out. This equates with correlation of the size of the projected pattern with the article cross-sectional layer size so that, for example, in the case of a smaller article there is avoidance of wasted expenditure of analysis effort, thus computing power and data output, on an imaged pattern extending beyond the boundaries of the area of actual interest.

It is advantageous if the steps of projecting and imaging are carried out with use of dedicated optics dissociated from the energy introduction, so that the possibility of mutual influencing is eliminated and an optical system for projection and imaging can be optimised just for the task of monitoring. Energy introduction can be by various methods, but preferably comprises scanning each powder material layer by an electron beam. Such a procedure offers a rapid scanning rate and high levels of beam control and consequently there is significant benefit from monitoring to prevent ongoing fast manufacture with an undetected defect, which if detected may be able to be readily addressed by way of one or other adjustment of the beam operation.

According to a second aspect of the present invention there is provided additive layer manufacturing apparatus comprising powder deposition means for successively depositing layers of fusible powder material in overlying relationship, beam generating and transmission means for introducing energy into each deposited layer to selectively melt material in the layer so as to fuse the melted material together and to already fused material of a layer thereunder for layer-by-layer production of a three-dimensional solid article, optical projection means for optical projection of structured light defining a fringe pattern onto each deposited layer in at least one of a time before and a time after the melting of material in that layer, optical imaging means for optical imaging of the fringe pattern on each layer from a perspective different from that of the projection so as to reveal disturbance of the pattern by topographical features of the layer, analysing means for analysing the imaged fringe pattern with respect to any such revealed disturbance to recognise defects in the respective layer of powder material if the structured light was projected onto the layer before the melting of material therein or defects in a cross-sectional layer of the article if the structured light was projected onto the layer after the melting of material therein, and influencing means for correctively influencing layer deposition in the ease of recognition of defects in the powder material layer and energy introduction in the case of recognition of defects in the article cross-sectional layer.

Apparatus embodying the invention offers the same advantages as described beforehand in connection with the method, in particular last and accurate monitoring of each powder layer, before and/or after beam action on the layer, and apparatus control to correctively influence the characteristics of the unmelted powder layer and/or the characteristics of the selectively melted and fused layer.

For preference, the influencing means is arranged to control the powder deposition means to remove or at least reduce recognised defects in a powder material layer, which represents a particularly effective route to corrective action. For that purpose, the influencing means preferably comprises processing and controlling means for processing data supplied by the analysing means and indicative of recognised defects in a powder material layer and for controlling the powder deposition means in dependence on the processed data. The output of the analysing means can thus be converted into directly usable control data appropriate to requirements.

With respect to corrective influencing of layer deposition the powder deposition means can comprise, for example, one or more of powder material dispensing means controllable by the processing and controlling means to carry out repeat dispensing of powder material for a powder material layer, powder material spreading means controllable by the processing and controlling means to carry our repeat smoothing of powder material of a powder material layer, and vibrating means controllable by the processing and controlling means to vibrate a powder material layer for resettling of the powder material thereof. Any one or a combination of these measures can be deployed, as appropriate, for rapid elimination of a defect or defects in the powder material layer.

Additionally or alternatively the influencing means can be arranged to control the beam generating and transmission means to remove or at least reduce recognised defects in an article cross-sectional layer. This can be carried as appropriate in relation to a current cross-sectional layer or, if the defect is not immediately critical, in a next such layer. For that purpose the influencing means can comprise processing and controlling means for processing data supplied by the analysing means and indicative of recognised defects in an article cross-sectional layer and for controlling the beam generating and transmission means in dependence on the processed data. Similarly to the influencing of layer deposition, the output of the analysing means can again be converted into directly usable control data appropriate to influencing the beam operation.

In that connection, with respect to corrective influencing of energy introduction the beam generating and transmission means is preferably controllable by the processing and controlling means to carry out at least partial remelting of material in the article cross-sectional layer. As in the case of the described method, if the energy introduction is to be correctively influenced in relation to a subsequent layer then parameters of the beam generation and transmission can be adjusted before the next scanning step is carried out.

For preference, the beam generating and transmission means is operable to generate and transmit an electron beam, which represents a form of apparatus offering a particularly fast rate of precisely controllable manufacture and consequently benefiting from the continuous quality control monitoring made possible by the optical system of projection, the imaging and analysis based on structured light and the utilisation of the analysis results by the influencing means in relation to layers in unmelted and/or melted state.

A preferred example of the method and a preferred embodiment of the apparatus according to the invention will now be more particularly described with reference to the accompanying drawings, in which.

DETAILED DESCRIPTION OF THE ILLUSTRATED EMBODIMENTS

Figure 1:
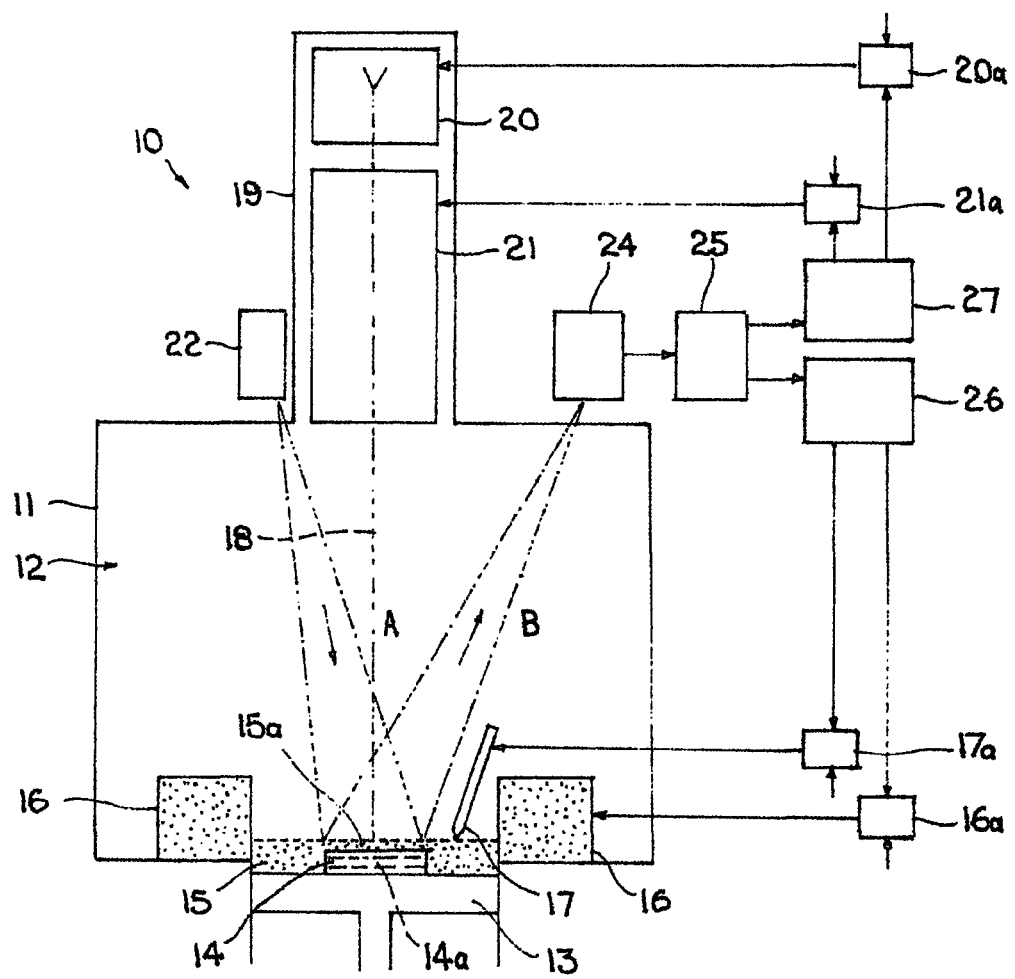
FIG. 1 is a schematic elevation, partly in block diagram form, of additive layer manufacturing apparatus embodying the present invention.

Referring now to the drawings there is shown in FIG. 1 additive layer manufacturing apparatus 10 in an exemplifying form comprising a housing 11 bounding a vacuum chamber 12, the housing having the form of a pressure vessel able to be evacuated to provide a desired subatmospheric pressure. Manufacturing is carried out in the chamber 12 on an incrementally lowerable table 13 for supporting an article 14 or artefact to be manufactured by an additive layer or 3D printing process. In this process, a fusible powder material 15, such as a selected metal, usually a metal alloy, is distributed from diagrammatically represented controllable dispensers 16 onto the table 13 and adjoining regions and is spread by a similarly diagrammatically represented controllable spreading and levelling element 17, such as a blade (shown here) or roller, to form a thin powder material layer 15a of uniform depth on the table. The powder material 15 of the layer 15a is then selectively melted and fused by the action of heat in a predefined area. The powder material 15 in that area forms, after solidification, a cross-sectional layer of the article 14 perpendicular to the plane of the drawing. Individual cross-sectional layers of the article 14 formed by fusion of powder material layers prior to and thus below the illustrated layer 15a are denoted by 14a and shown, like the powder material layer 15a, with exaggerated thickness or depth. Residual powder material 15 surrounding the melt area and ultimately the article 14 as a whole plays no further part in the process, but remains as part of the powder bed until recovered and recycled or discarded. After formation of each such cross-sectional layer 14a of the article 14 the table 13 is lowered by the cross-sectional layer depth or thickness, which has a predetermined value, and a further layer 15a of powder material 15 is distributed over the solidified part of the preceding layer to form—by selective melting and fusing together as well as to the fused material thereunder over the same or a different predefined area—as next cross-sectional layer 14a of the article 14. The process is repeated until construction of the article 14 on a layer-by-layer basis is completed.

The heat for melting the powder material 15 to induce fusion can be supplied by, in particular, a laser beam or a charged particle beam, in the case of this apparatus by an electron beam 18 generated and transmitted by an electron beam column 19 mounted on the housing 11. The column 19 comprises a controllable electron beam generating unit 20 containing an electron source, generally a cathode of electron emissive material capable of emitting electrons under applied voltage, and a controllable beam focussing, blanking and deflecting unit 21 comprising, for example, a series of lens for focussing the electrons for propagation as a beam of defined cross-sectional size and shape along the axis of the column 19 and a continuation of that axis, a blanking aperture for effectively switching the beam on and off, and a deflector for deflecting the beam relative to the extended axis. The deflector is operable under programmed computer control in such a way as to cause the beam 18 to scan the instantaneous powder material layer 15a at high speed to melt the powder 15 in an area corresponding with a desired shape of a cross-sectional layer 14a of the article 14 as described in the preceding paragraph. The area to be scanned is generally finely resolved into multiple fields scanned one at a time along a predefined path within each field to melt the powder, either on a single visit or preferably by progressive heat build-up from several visits. Individual control units 16a, 17a, 20a and 21a are provided to control, respectively, the powder material dispensers 16, the spreading and levelling element 17, the beam generating unit 20 and the beam focusing, blanking and deflecting unit 21. The control units are shown as individual items merely by way of convenient example and in practice may be realised by hardware and/or software.

Additive layer manufacture by this process is generally known and has been described only to the extent necessary for general understanding of the construction and operation of the exemplifying form of apparatus 10 used for such a purpose.

As outlined in the introduction, a particular challenge to successful performance of additive layer manufacturing is represented by various faults which may appear at the stage of deposition of each powder layer 15a and at the stage of selective melting of the deposited layer. In order to address these issues, the apparatus 10 comprises a system capable of optically monitoring each powder material layer 15a deposited on the table 13 and the article cross-sectional layer 14a produced therefrom, analysing the results of the optical monitoring to recognise aberrations in the manufacturing process and/or to assure continuing adherence to manufacturing specifications, and to carry out—when and where necessary—corrective action via components involved in the manufacturing process, in particular a process with the monitoring and feedback steps described below with reference to FIG. 2.

For this purpose, the apparatus shown in FIG. 1 includes a non-contact measurement system comprising an optical projector 22 for projecting structured light on an optical path A through the vacuum chamber 12 via a window (not illustrated) to define a fringe pattern on each deposited powder material layer 15a. Projection is carried out before beam action on the layer for melting constituent powder material, after such beam action or, as in the case of the described embodiment of the apparatus 10, both before and after beam action. The fringe pattern, which is generated by computer software, can take various forms, but expediently consists of an array of regularly spaced stripes 23 of contrasting tone (fringes), an example of such a projected fringe pattern being shown in FIG. 1A in the form of a small segment, to greatly enlarged scale, of the pattern. As the path A of the projection beam in FIG. 1 evidences, the incident fringe pattern is substantially coterminous with the area of the powder material layer 15a in which melting is carried out to form a cross-sectional layer 14a of the article 14, thus the whole of the general zone of scanning action of the electron beam 18 on the powder material 15 in each layer 15a.

Figure 1A:
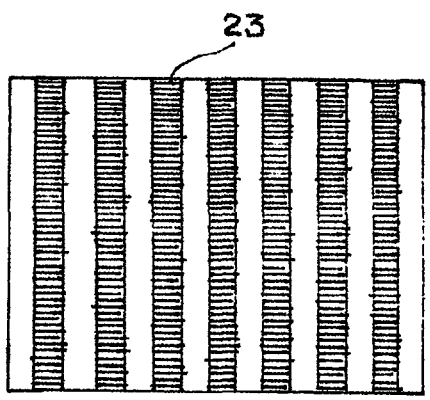
FIG. 1A is a diagram, to substantially enlarged scale, of a fringe pattern produced by structured light projection in the apparatus.
Figure 1B:
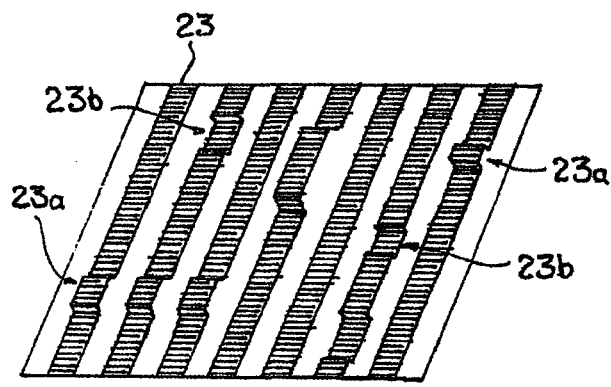
FIG. 1B is a diagram based on that of FIG. 1A, but showing an image of the pattern from a perspective different from that of the projection.

The measurement system further includes an optical imaging camera 24 for imaging, the projected fringe pattern on an optical path B through the vacuum chamber 12 via a further window (also not illustrated), the imaged pattern being shown in FIG. 1B with, by comparison with FIG. 1A, an obliquity signifying the angle of the optical imaging path B relative to the optical projection path A. Since the imaging undertaken from a perspective different from that of the projection, as represented by the relatively angled optical paths A and B, topographical features, in particular elevations and depressions, in the area of the layer 14a or 15a onto which the fringe pattern was projected manifest themselves as disturbances in or distortions of the individual stripes 23 of the imaged fringe pattern. Such disturbances are reproduced, as shown in FIG. 1B, in the form of local elevations 23a and depressions 23b in specific stripes. The elevations 23a in the case of the unmelted powder material layer 15a may be formed by the crests of undulations in the layer, agglomerations of particles, displacements due to protrusions from an underlying layer and other such faults, and the depressions 23b may be formed by the valleys of such undulations, voids, areas of missing powder, scores due to particle drag by or damage of the spreading and levelling element 17 and various other issues. Similarly, elevations 23a in the case of the article cross-sectional layer 14a produced by selective melting of material of the powder material layer 15a may be caused by swelling of the article 14 during production, faults in scanning or in other aspects of beam action in departure from the prescribed article design parameters, and other problems. Depressions 23b in the article cross-sectional layer 14a may arise from pre-existing faults with the powder material layer 15a, such as voids and missing areas of powder, and again from departures from design parameters, to mention just the principal causes.

Recognition of defects of these kinds is achieved by analysis of each imaged fringe pattern by an analysing unit 25 employing analysis techniques as described below in connection with FIG. 2. The analysing unit 25 produces first data which characterise, faults in the powder material layer 15a prior to beam action and second data which characterise faults in the article cross-sectional layer 14a evident after beam action, the first data being supplied to and processed by a first processor 26 for determining corrective action in relation to the powder disposition in the powder material layer 15a and the second data being supplied to and processed by a second processor 27 for determining corrective action in relation to the operation of the beam 18. Accordingly, the first processor 26 generates and issues encoded instructions, insofar as they are needed, for corrective action to the control units 16a, 17a for the powder material dispensers 16 and the spreading and levelling element 17 and the second processor 27 generates and issues encoded instructions, insofar as they are needed, for corrective action to the control units 20a, 21a for the beam generating unit 20 and the beam focusing, blanking and deflecting unit 21. These corrective actions may be additional to the usual control actions performed by the control units 16a, 17a, 20a and 21a, as represented by the illustrated further inputs to the units for usual control variables, or may, appropriate, be provided by suitable modification of those variables. It is to be understood that, like the control units, the illustrated processors 26, 27 are merely graphical representations of functional capabilities of the apparatus and in practice the processors could be realised by, for example, part of the software of a general control system.

The corrective action able to be undertaken by the spreading and levelling element 17 under the control of its control unit 17a includes repeat smoothing of the surface of the powder material layer 15a or repeat spreading of the layer, whereas the dispensers 16 can be controlled by the respective control unit 16a to discharge material for addition to the layer 15a or even complete replacement of the layer. If the apparatus 10 includes a facility for imparting vibration to the layer to resettle the constituent powder material 15 this can also be carried out under the control of one of the control units 16a, 17a or a further such control unit. Similarly, the corrective action able to be undertaken by way of the beam generating unit 20 under the control of its control unit 20a includes adjustment of beam power and hence the energy introducible into the layer 15a to melt the powder material 15, whereas the corrective action able to be exercised by the beam focussing, blanking and deflecting unit 21 under the control of the respective control unit 21a includes change in beam spot size, change in dwell or exposure time during scanning, variation of scanning rate, repeat scanning of selected areas and various other possibilities connected with beam operation.

It should be noted that the projector 22 is arranged as closely as possible to the column axis, the axis being the ideal axis for the optical path A. Compensation for any influence on the projected fringe pattern by the offset of the axis of the path A from the column axis can be included in the analysis undertaken by the analysing unit 25.

Figure 2:
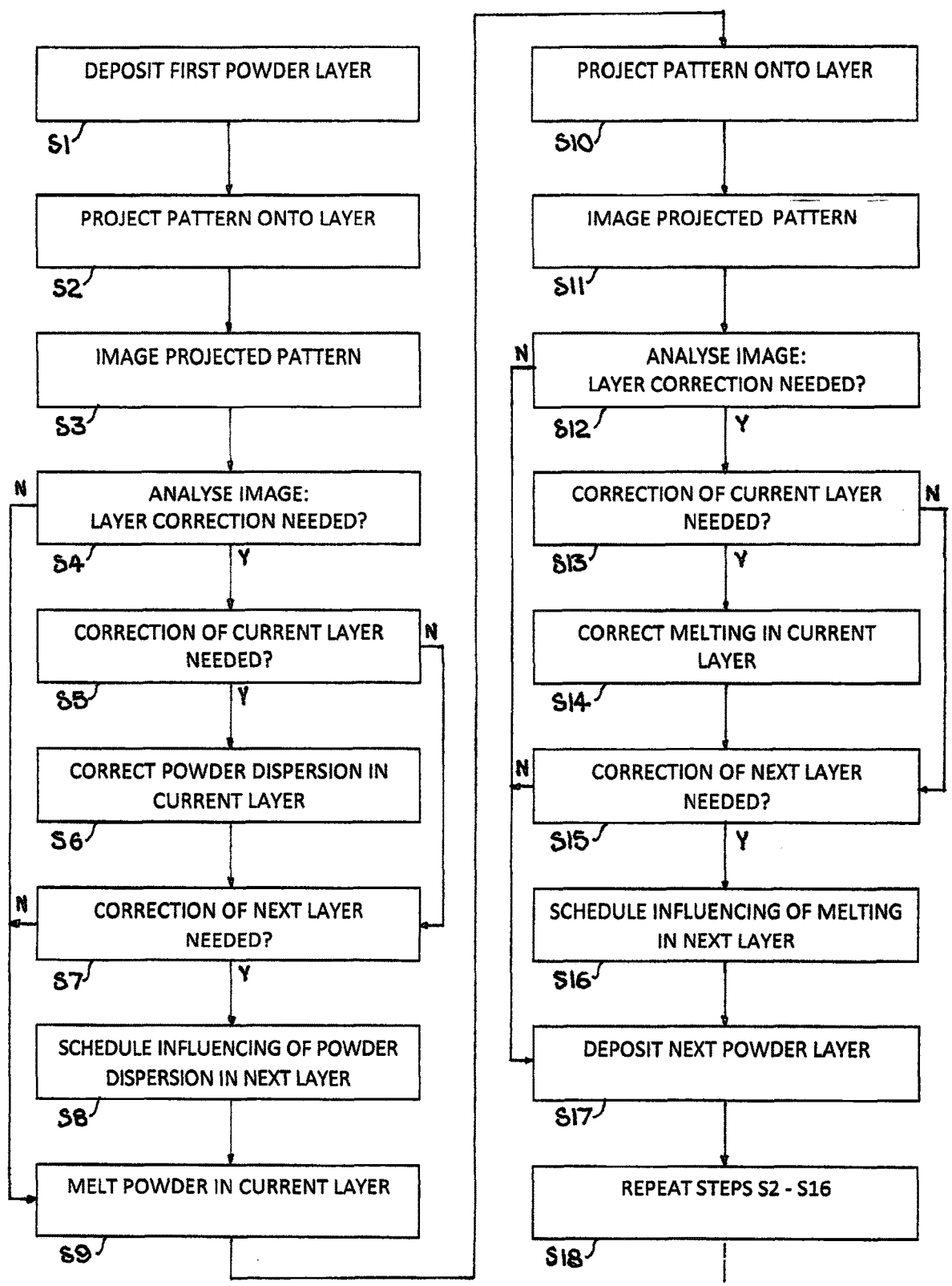
FIG. 2 is flow chart showing the steps of a method exemplifying the invention and performable by the apparatus of FIG. 1.

FIG. 2 shows, in the form of a flow chart, the steps of an exemplifying method performable by the apparatus 10 of FIG. 1 or other such apparatus with equivalent or otherwise appropriate features; in the following, the method is described specifically on the basis of performance by the apparatus 10 of FIG. 1. In a first step S1 a layer of fusible metallic powder material is deposited on the table, in an uppermost position thereof, by co-ordinated operation of the dispensers and the spreading and levelling element, the former to discharge the powder from reserves into a region adjacent to the table and the latter to spread the powder over the table in a layer of uniform depth and with a level or smooth surface. As already mentioned, in practice the formed layer may exhibit various faults or departures from the ideal, such as voids, areas of missing powder, scores, lines, hollows, troughs, pits, bumps, mounds, ridges and generally uneven or irregular depth, as well as possibly an overall depth differing, in positive or negative sense from a prescribed depth. Accordingly, prior to action—in this embodiment by an electron beam—on the powder material layer for selective melting of a predefined area in correspondence with an intended cross sectional layer of the article to be produced, structured light defining a fringe pattern with stripes of alternating contrast as shown in exemplifying form in FIG. 1A is projected onto the layer in a step S2. This is followed by a step S3 in which the pattern is imaged from a perspective different from that of the projection to reveal disturbances in the linearity of the pattern stripes due to local variations in the layer depth, specifically elevations and depressions (cf. FIG. 1B) in the layer surface.

The image is then analysed in a step S4 to assign X and Y co-ordinates to the revealed disturbances and recognise the specific faults responsible for the disturbances. Analysis can be carried out by known procedures, taking into account that in the case of the disturbances such as shown in FIG. 1B the height of a particular elevation may be encoded as a function of the spatial phase of the fringe pattern ($\varphi$), i.e. spacing of the fringe pattern stripes, projected onto the layer surface. Consequently, the geometry of the elevation will modulate the intensity distribution of the fringe pattern, i.e. contrast of the pattern stripes, as expressed by the equation:

$$g(x,y)=a(x,y)+b(x,y)\cos(2\pi f_0 x+\varphi(x,y))$$

in which $a(x,y)$ is the background illumination, $b(x,y)$ is the amplitude modulation of the fringe pattern stripes, $f_0$ is the spatial frequency carrier, $\varphi(x,y)$ is the phase modulation of the fringe pattern stripes (the required phase distribution) and x and y are the sample indices for the X and Y axes, respectively.

The important aspect of the analysis to recognise faults represented by the disturbances in the fringe pattern image is extraction of the phase from the intensity distribution, as given by the equation. Various fringe pattern techniques have been proposed for demodulation of fringe patterns, such as phase stepping procedures, Fourier fringe analysis (FTA), direct phase detection (DPD), wavelet transform fringe analysis and other algorithms. These techniques produce a wrapped phase rather than the required phase; consequently, phase unwrapping algorithms are also required to recover the true phase from the wrapped phase. Finally, the calculated phase difference, which gives relative height information, is converted into absolute height by use of a reliable height calibration model. The steps of fringe pattern analysis can accordingly be summarised as subjecting the imaged fringe pattern $g(x,y)$ to an appropriate fringe pattern algorithm of one of the mentioned kinds to obtain the wrapped phase $\psi(x,y)$, which is then subjected to a phase unwrapping algorithm to obtain the unwrapped phase $\varphi(x,y)$. Finally, processing of this by a phase-to-height model gives the absolute height $h(x,y)$ of an individual elevation, on the basis of which the presence and location of a fault is recognised and from that the need for layer correction.

Depending on the nature of a recognised fault a decision can be made in step S5 whether correction of the powder dispersion in the current layer is needed, which will be the case particularly if a fault located within the area of powder material to be melted is liable to impact on the integrity of the article cross-sectional layer to be produced by the selective melting. If correction of the current layer is required, this is undertaken in a succeeding step S6, in which, for example, the spreading and levelling element 17 is operated to redistribute, relevel or even partially remove powder making up the layer, or to reconstitute the layer with the addition of supplementary powder from the dispensers 16. If the apparatus includes equipment for vibrating the powder bed containing the layer the equipment can be operated to gently shake the layer and in that way resettle the powder to eliminate small elevations.

If a particular fault is recognised, but is determined—such as by reference to fault thresholds—to be of a kind not requiring, immediate rectification, a decision can be made in a step S7 to carry out correction in the next layer and this is scheduled, in a step S8, for implementation at the appropriate time. Accordingly, in step S8 suitable adjustments can be made, for example to future pass speed or number of passes of the spreading and levelling element or to future aspects of the discharge of powder from the dispensers, the powder composition and the powder flowability, so as to avoid repetition of a fault of a kind which may be non-critical in the current layer, but potentially critical in subsequent layers, especially if there is a cumulative effect.

When the appropriate actions have been carried out in the step S6 and/or step S8 or if no such actions are needed the method can proceed to a step S9 in which selective melting of powder in the originally laid or improved layer is carried out by electron beam scanning under control of a program determining the powder area to be melted so as to form the respective shape of the article cross-sectional layer, in a step S10, structured light projection to superimpose the fringe pattern on the layer, now containing an area of molten material, is carried out analogously to step S2 and the pattern is then imaged in a step S11 analogously to step S3 to reveal disturbances in the pattern, but now disturbances representing faults connected with melting, for example an area erroneously missed from melting and having a height signifying unmelted powder rather than a melt pool. In similar manner to step S4, the obtained image is now subjected to analysis in a step S12 to identify whether layer correction is needed and, if so, decisions are made in steps S13 and S15, analogously to steps S5 and S7, as to whether correction is required to the current layer and/or to the next layer. If correction is required to the current layer then in a step S14, for example, the material is remelted to at least some extent to remove the fault or faults in the current layer and if correction is required to the next layer then, for example, the beam generation and/or transmission control is scheduled in step S16 for adjustment to change such factors as beam power, beam scanning (deflection) rate, beam spot size or even shape, beam dwell time, number of visits to each site (melt point) and so forth so that the fault does not or should not recur.

After the action or actions in step S14 and/or step S16 has or have been undertaken or if no action is required the method proceeds to a step S17 in which, after lowering of the table by the depth of the article cross-sectional layer, the next powder layer is deposited on top of the first layer as the first step in creating the next cross-sectional layer in layer-by-layer manufacture. In a step S18, the steps S2 to S16 are repeated in relation to that next layer and subsequently after each deposition, through repetition of step S17, of a fresh powder layer.

Although the example of the method described with reference to FIG. 2 includes structured light projection and pattern imaging to enable layer analysis both before and after selective melting of layer, it is entirely possible, depending on requirements, to undertake projection, imaging and analysis only before or only after the melting phase.

The described apparatus embodying and method exemplifying the present invention enable continuous optical monitoring of critical aspects of the additive layer manufacturing process and determination of corrective actions in real time, which may allow significant improvement in the quality of articles produced by the process or otherwise ensure that a desired standard of quality is maintained.

The invention claimed is:

1. Method of additive layer manufacture comprising the steps of
    successively depositing layers of fusible powder material in overlying relationship,
    introducing energy into each deposited layer to selectively melt powder material in the layer so as to fuse the melted material together and to already fused material of a layer thereunder for production of a three-dimensional solid article in successive cross-sectional layers,
    projecting structured light defining a fringe pattern onto each layer in both a time before and a time after the melting of material in that layer,
    imaging each fringe pattern on each layer from a perspective different from that of the projection so as to reveal disturbance of the pattern by topographical features of the layer,
    analysing the imaged fringe pattern with respect to any such revealed disturbance to recognise defects in the respective layer of powder material when the structured light was projected onto that layer before the melting of material therein and defects in a cross-sectional layer of the article formed from the respective powder material layer when the structured light was projected onto that layer after the melting of material therein
    and correctively influencing layer deposition in the case of recognition of defects in the powder material layer and energy introduction in the case of recognition of defects in the article cross-sectional layer.

2. A method according to claim 1, wherein the step of analysing to recognise defects in the powder material layer comprises recognition of local variations in depth of the layer.

3. A method according to claim 2, wherein the recognised local variations in the depth of the powder material layer include depressions in the form of undulations in the layer or voids or areas of missing powder in the layer.

4. A method according to claim 2, wherein the recognised local variations in the depth of the powder material layer include elevations in the form of undulations in the layer or displacements due to protrusions into the layer from below.

5. A method according to claim 1, wherein the step of analysing to recognise defects in the article cross-sectional layer comprises recognition of local variations in depth of the cross-sectional layer.

6. A method according to claim 5, wherein the recognised local variations in the depth of the cross-sectional layer include depressions caused by voids or areas of missing powder in the powder material layer from which the cross-sectional layer was formed or by generation of the cross-sectional layer otherwise than in accordance with specification.

7. A method according to claim 5, wherein the recognised local variations in the depth of the cross-sectional layer include elevations caused by swelling of the article during production in a direction perpendicular to the cross-sectional layer or by generation of the cross-sectional layer otherwise than in accordance with specification.

8. A method according to claim 2, wherein the step of analysing comprises identifying recognised local variations by assignment of Cartesian co-ordinates.

9. A method according to claim 2, wherein the step of analysing comprises subjecting the imaged fringe pattern to a fringe pattern algorithm to obtain a wrapped phase, subjecting the wrapped phase to a phase unwrapping algorithm to obtain an unwrapped phase giving true phase and processing the true phase by a phase-to-height model to give an elevation height or depression depth.

10. A method according to claim 1, wherein the step of analysing to recognise defects in the article cross-sectional layer comprises recognition of departure of the shape of the melt area from a predetermined shape.

11. A method according to claim 1, wherein the step of correctively influencing layer deposition comprises
vibrating a powder material layer to resettle the powder material thereof,
repetition of smoothing of the top surface of a powder material layer,
adding material to or removing material from a powder material layer
and replacing a powder material layer.

12. A method according to claim 1, wherein the step of correctively influencing layer deposition is carried out on at least one of the current powder material layer and a subsequent powder material layer.

13. A method according to claim 1, wherein the step of correctively influencing energy introduction comprises at least partial remelting of material in the article cross-sectional layer.

14. A method according to claim 1, wherein the step of projecting comprises forming the fringe pattern to be substantially coincident with the area of the powder bed layer in which selective melting is carried out.

15. A method according to claim 1, wherein the steps of projecting and imaging are carried out with use of dedicated optics dissociated from the energy introduction.

16. A method according to claim 1, wherein the step of introduction of energy into each powder material layer comprises scanning the layer by an electron beam.

* * * * *